United States Patent [19]

Hutton et al.

[11] 4,245,347

[45] Jan. 13, 1981

[54] REMOTE EQUIPMENT CONTROL SYSTEM WITH LOW DUTY CYCLE COMMUNICATIONS LINK

[76] Inventors: Thomas J. Hutton, 22 W. Swissvale Ave., Pittsburgh, Pa. 15218; John W. Kramer, Jr., 5530 Wilkins Ave., Pittsburgh, Pa. 15217

[21] Appl. No.: 870,446

[22] Filed: Jan. 18, 1978

[51] Int. Cl.[3] .......................... H04B 1/06; H04Q 1/32

[52] U.S. Cl. ........................................ 455/70; 455/68; 455/352; 340/167 A

[58] Field of Search ................... 325/37, 64, 165, 391, 325/390, 392, 395, 396; 340/164 B, 304, 147 R, 147 A, 147 PC, 167 R, 167 A; 455/67, 68, 70, 71, 72, 352

[56] References Cited

U.S. PATENT DOCUMENTS

| | | | |
|---|---|---|---|
| 3,339,141 | 8/1967 | Rothenbuhler | 325/37 |
| 3,482,046 | 12/1969 | Hughson | 325/37 |
| 3,582,783 | 6/1971 | Hendrickson | 325/37 |
| 3,705,386 | 12/1972 | Gueldenpfenning et al. | 340/167 A |
| 3,755,744 | 8/1973 | Eukata | 325/64 |
| 4,019,142 | 4/1977 | Wycoff | 325/392 |
| 4,047,107 | 9/1977 | Dickinson | 325/37 |
| 4,091,328 | 5/1978 | Hellman | 325/37 |

FOREIGN PATENT DOCUMENTS

| | | | |
|---|---|---|---|
| 1131801 | 1/1966 | United Kingdom | 325/38 |

*Primary Examiner*—Robert L. Richardson
*Assistant Examiner*—Tommy P. Chin
*Attorney, Agent, or Firm*—Harold A. Williamson

[57] ABSTRACT

The invention is directed to a remote equipment control system having a low duty cycle communications link between a remote command transmitter and a remote receiver. The remote receiver is controllingly coupled to the equipment. The remote command transmitter includes a means to transmit a message signal of set time duration at a preselected message separation interval. The message signal has a unique address portion and a command portion.

The remote receiver includes a decoding unit and a timing circuit. The decoding unit is responsive to the unique address portion of a received message to provide an enabling signal to be delivered to the timing circuit. The timing circuit upon receipt of the enabling signal provides an output to the decoding unit to prevent entry of any message signal to the decoder for a time duration matching the preselected message separation interval and allowing entry of a message signal for a time duration matching the time duration of the message signal. The enabling signal also conditions the decoder to accept the next arriving message signal allowed entry which has the unique address, whereupon the message signal command portion is decoded and a command signal is delivered to the remote equipment to be controlled.

8 Claims, 3 Drawing Figures

REMOTE EQUIPMENT CONTROL SYSTEM WITH LOW DUTY CYCLE COMMUNICATIONS LINK

Figure 1:
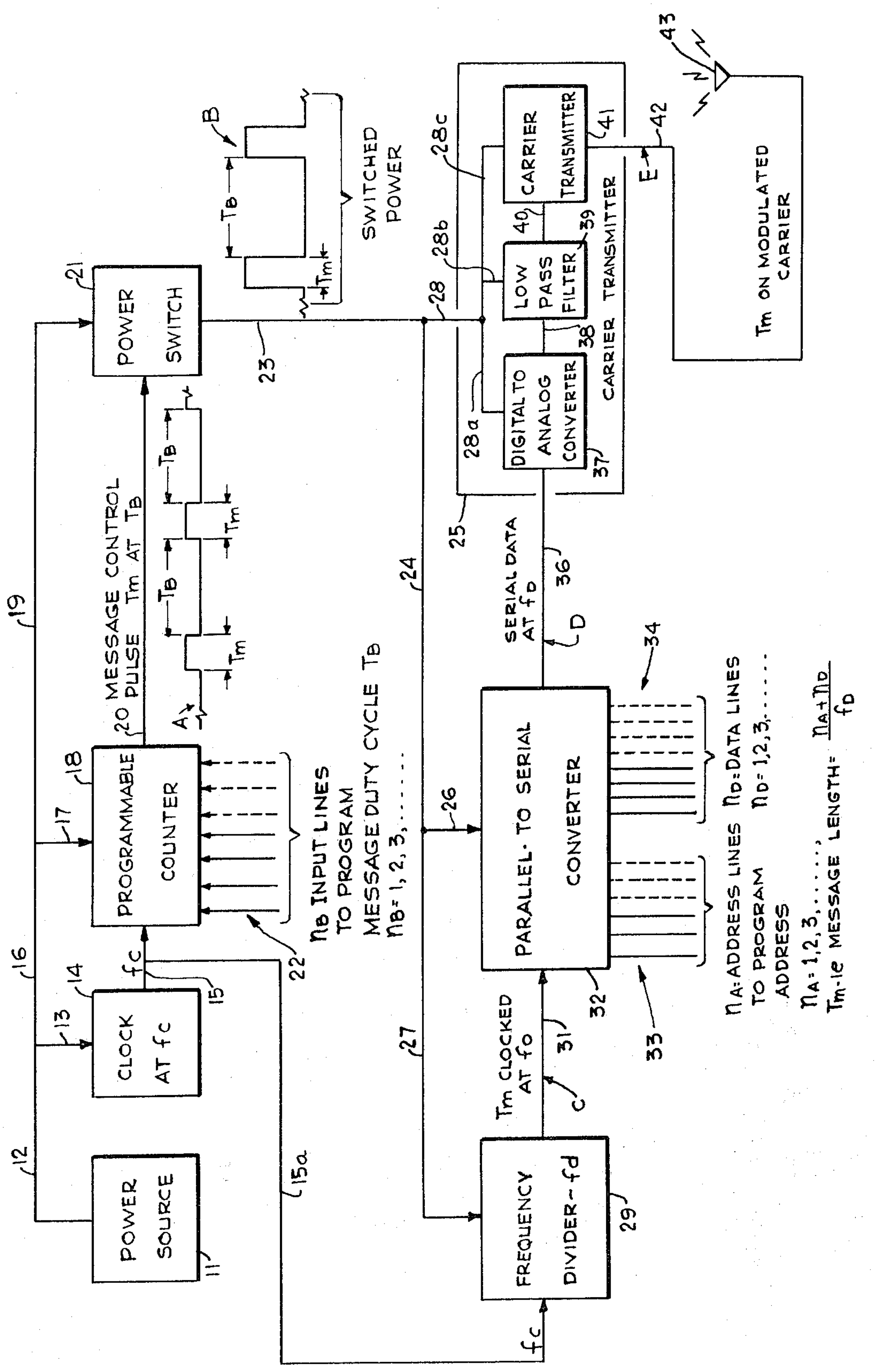

This invention relates to a remote equipment control system.

More specifically, this invention relates to a digital remote control system which has a low duty cycle communications link between a remote command transmitter and a remote receiver located at the equipment to be controlled.

In the face of upwardly spiralling inflation, the battle cry in industry has been "productivity". At every turn increased mechanization and automation have been called upon to push productivity to new and more economically advantageous levels. Hand in hand with the push for greater productivity has been increased use of remote controlled equipment. Productivity has been enhanced by the ability to remove a man from his physical location by or on the equipment and by having one man remotely control the equipment while simultaneously overseeing other jobs and performing additional tasks remote from any given piece of equipment.

The limited number of ratio frequency channels available for remote control communications links coupled with the increased density of concurrent use by individuals in the field, as well as the demand for fail-safe operation, have created problems. The pressure of these problems provided impetus to creative minds that have fashioned a number of clever and inventive solutions to these problems.

The Patterson U.S. Pat. No. 3,293,549 is one such solution to the problem of interference on a common carrier frequency where a number of transmitters in a given area are using the same carrier frequency.

Patterson recognizes that he can provide the equivalence of a random pulse generator in the remote control transmitter by eemploying the heartbeat of an operator to control the modulation of the carrier.

The Patent to Lefevre, U.S. Pat. No. 3,315,263 provides the operator with a high frequency battery powered transmitter that transmits from the protective helmet of the operator.

The Hendrickson U.S. Pat. No. 3,582,783 which is directed to a multiple-function remote control system includes in its receiver an inhibiting circuit to enhance the system's immunity to extraneous signals. This inhibiting circuit includes a timing signal generator in the receiver responsive to the received modulated carrier wave signal to reconstruct therefrom the timing signal generated by the transmitter. The reconstructed timing pulses are simultaneously applied to a detector and gating circuit to permit application of the actuating signal to the control device.

From the above it can be seen that there have been a wide range of contributions to the art of remote control, all of which are dependent on respectively, a hoped for random operation, a unique package or a timing arrangement whose accuracy is difficult to maintain in the field. The invention to be described hereinafter provides a definitive improvement over the remote control apparatus now available as is typified by the art referred to above.

It is therefore a primary object of this invention to provide a remote control communications system which has a very low duty cycle.

Another object of this invention is to provide a remote control system which can readily be employed in a host of adverse industrial environments, such as, but not limited to, radio remote control of cranes, locomotives, remote oven door operation and automated materials handling in rolling mill applications.

Another object of the invention is to provide a digital control communications system which will allow a single operator to replace a multi-man crew.

Still another object of this invention is to provide a remote control system in which response times can be tailored to be equivalent to a manual mode.

Yet another object of this invention is to provide a remote control transmitter whose power requirement is so small as to require a battery of minimal size resulting in a portable unit which weighs less than four (4) pounds and can provide two hundred or more hours of continuous service operation on a single battery charge.

Another object of this invention is the ready provision of from two or more than one hundred on/off control functions.

In the attainment of the foregoing objects there is provided a remote equipment control system having a low duty cycle communications link between a remote command transmitter and a remote receiver. The remote receiver is controllingly coupled to the equipment.

The remote command transmitter includes a means to transmit a message signal of set time duration at a preselected message separation interval. The message signal has a unique address portion and a command portion.

The remote receiver includes a decoding unit and a timing circuit. The decoding unit is responsive to the unique address portion of a received message to provide an enabling signal to be delivered to the timing circuit. The timing circuit upon receipt of the enabling signal provides an output to the decoding unit to prevent entry of any message signal to the decoder for a time duration matching the preselected message separation interval and allowing entry of a message signal for a time duration matching the time duration of the message signal. The enabling signal also conditions the decoder to accept the next arriving message signal allowed entry which has the unique address, whereupon the message signal command portion is decoded and a command signal is delivered to the remote equipment to be controlled.

In the preferred embodiment of the invention the remote command transmitter is always in a power off condition until it is desired to effect the remote control of equipment; while the remote receiver is always energized to an on condition to receive the message signal when the remote control equipment is waiting to be controlled.

Figure 2:
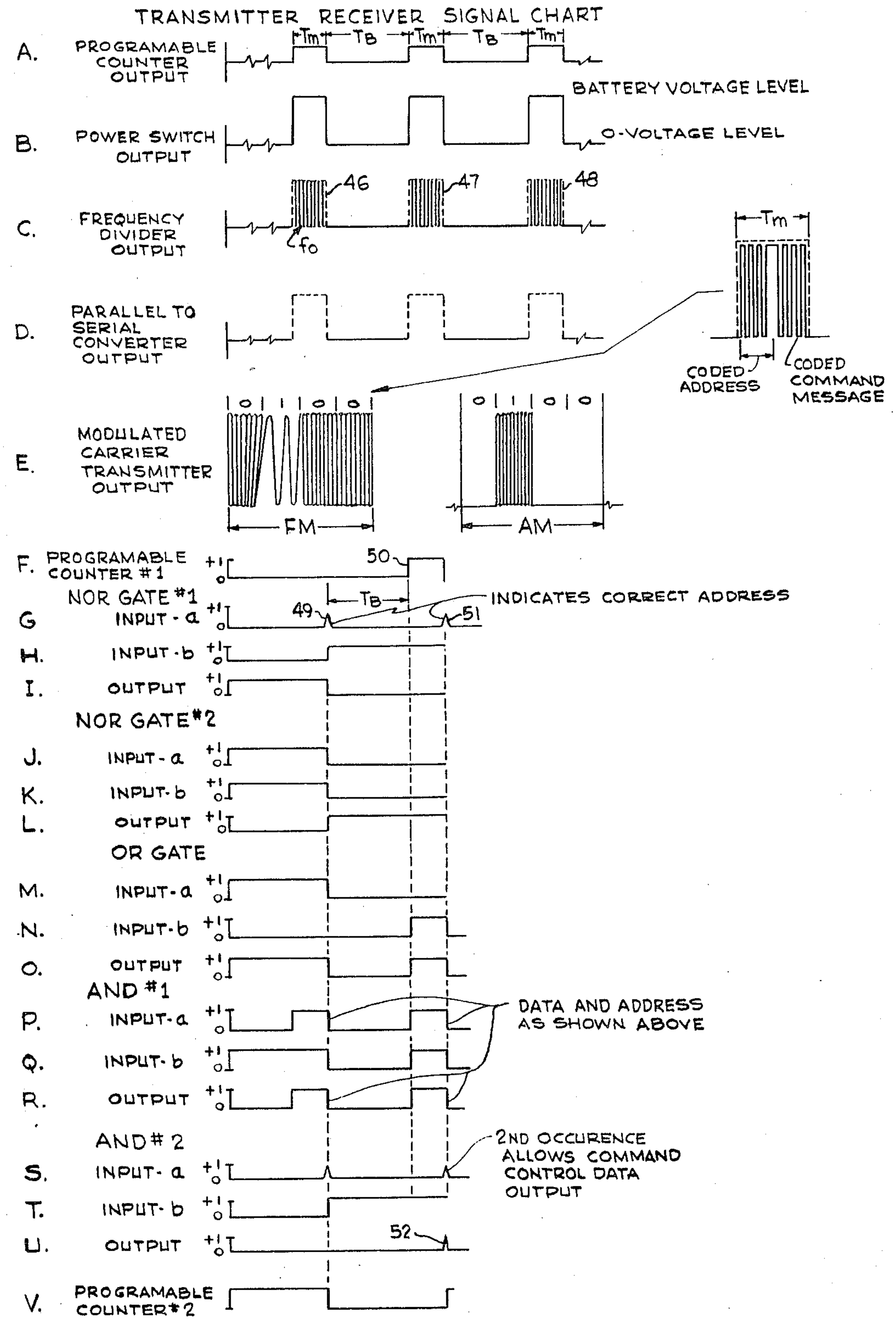
Figure 3:
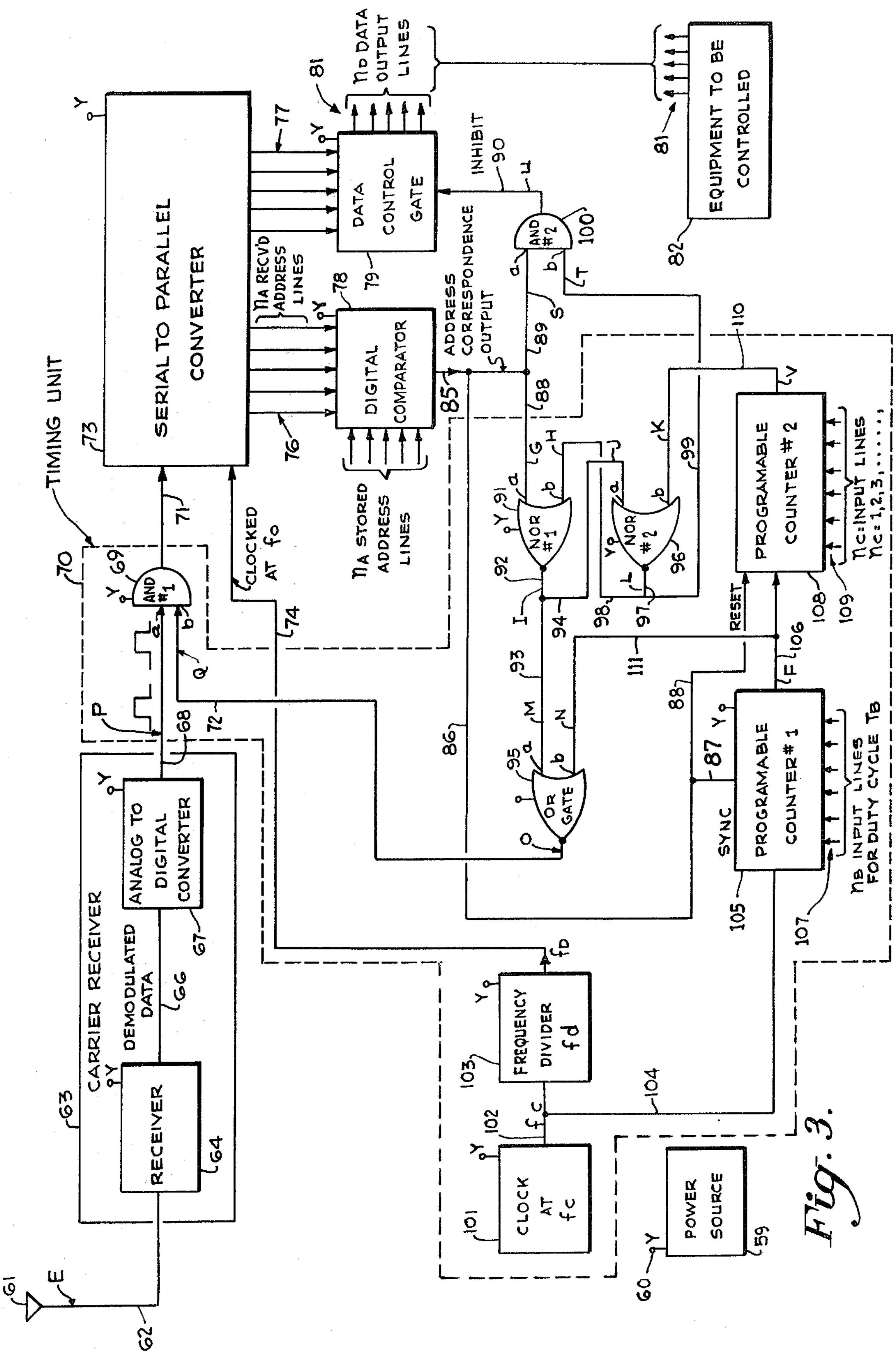

Other objects and advantages of the present invention will become apparent from the ensuing description of illustrative embodiments thereof, in the course of which reference is made to the accompanying drawings in which:

FIG. 1 is a block diagram of the command transmitter portion of the system that embodies this invention, and FIG. 2 is a transmitter and receiver timing signal chart which sets forth the dynamic signal relationship of the various components of the system that embodies the invention, and FIG. 3 is a block diagram of the receiver-decoder portion of the system that embodies the invention.

Reference is now made to FIG. 1 in which there is set forth a block diagram of the command transmitter which diagram illustrates the various electrical connections between major components. The transmitter schematically shown in FIG. 1 is designated a digital command transmitter and provides the means by which control commands may be entered into the system.

While not shown in the drawings, the digital command transmitter is in practice a portable unit. The circuitry of FIG. 1 may be housed in a small package that can be carried on the person or mounted upon a fixed console somewhere in the field. The details of the packaging of the portable command transmitter are not included in the discription that follows as these details do not directly form a part of the claimed invention. It is significant to note, however, that the circuitry of the FIG. 1 block diagram including a battery power source as well as packaging and switches weighs less than four (4) pounds.

The command transmitter includes a battery power source 11 connected by electrical leads 12, 13 to a clock 14 and by leads 12, 16, 17 to a programmable counter 18 as well as by leads 12, 16, 19 to a power switch 21. The power source 11 provides uninterrupted power to the clock 14, programable counter 18 and power switch 21. The clock 14 which provides an output at frequency fc delivers its clocked pulses simultaneously to the programable counter 18 and a frequency divider 29 via leads 15, 15*a*, respectively.

Reference numeral 22 and associated arrow are directed to a plurality of $N_b$ input lines to programable counter 18 to provide for the programming of a message duty cycle $T_b$ with a resultant wave form "A" on lead 20 of the type shown generally below lead 20 in this FIG. 1. From time to time throughout the specification reference will be made to FIG. 2 which illustrates a signal chart of the timed relationship of various signals as they appear in a real time fashion throughout the system. The relationship of the wave forms of FIG. 2 and their appearance on the various electrical leads of the circuits shown in FIG. 1 and FIG. 3 is enabled by the designation of the wave forms in FIG. 2 by capital letters "A" through "V", which letters appear in FIGS. 1 and 3 adjacent the electrical leads upon which they appear.

The programable counter provides as has been noted an output on lead 20 having the wave form "A" of FIG. 2. The positive going portion of the wave form is termed the message control portion and is designated $T_m$, while the interval between $T_m$ pulses is termed the duty cycle portion of the wave form and is designated $T_b$. The message control portion of $T_m$ of the wave form is also referred to hereinafter as the "message signal". The message signal in accordance with the invention is of a set time duration. In actual practice message signals may be selected to be in the range of 2 to 50 milliseconds. The duty cycle portion $T_b$ of the wave form is also referred to hereinafter as a "preselected message separation interval". The message separation interval can range in time typically from 0 to 500 milliseconds.

The amplitude of the message signal portion is increased when it passes through the power switch 21 from lead 20. The message signal with increased power which appears on lead 23 from power switch 21 is shown as wave form B in FIG. 1 and FIG. 2.

The message signal $T_m$, for example the application of battery voltage for time $T_m$, which appears on lead 23 is delivered simultaneously via leads 23, 23, 27 and 26 respectively to a frequency divider 29 and a parallel to serial converter 32. In a similar fashion, message signal $T_m$ which appears on lead 23 is delivered to a carrier transmitter 25 wherein a digital-to-analog converter 37, a low pass filter 39, and a carrier transmitter 41 simultaneously receive message signal $T_m$ via leads 23, 28, 28*a*; 23, 28, 28*b*, and 23, 28, 28*c* respectively. The digital to analog converter 37 is electrically connected via lead 38 to a low pass filter 39 which in turn is electrically connected via lead 40 to carrier transmitter 41. The cooperative function of the digital to analog converter 37, low pass filter 39, and carrier transmitter 41 will be explained more fully hereinafter.

It has been earlier indicated that the frequency divider 29 receives a pair of inputs namely a digital pulse at frequency fc via leads 15, 15*a* from clock 14 as well as message signal $T_m$ at a message separation interval $T_b$ via leads 27, 24, 23 from power switch 21. The frequency divider 29 operating at a frequency $f_d$ establishes a data rate. The frequency divider output can be seen on line C of FIG. 2 where dashed lines outline the envelopes 46, 47, 48 of bursts of digital signals at frequency $f_d$.

The parallel-to-serial converter 32 receives the signal in form shown in line C of FIG. 2 via lead 31 from the frequency divider 29. The parallel-to-serial converter 32 has a reference numeral 33 and an associated arrow 33 to a plurality of address lines as shown which are fed to converter 32. These address lines provide a digital coded unique address. A plurality of data or command function lines are also fed to the converter 32 and are designated by reference numeral 34 and associated arrow.

The equipment that is connected respectively to the address lines 33 and data or command function lines 34 represent state of the art devices the details of which do not form a part of the invention. Suffice it to say that there are push buttons, switches or joy stick controls which when activated initiate the coded data to these lines 33 and 34.

The readers' attention is now directed to line D of FIG. 2 where there is illustrated the envelope of the wave form that appears on lead 36 from the parallel-to-serial converter 32. At the right hand end of the wave form of line D, FIG. 2 there is shown for purposes of illustration in exaggerated detail a single message signal $T_m$ which has encoded in its digital format a unique coded address portion and a coded command portion.

The digital-to-analog converter 37, low pass filter 39, and carrier transmitter 41 represent a state of the art arrangement whose function is to provide either an FM modulated carrier transmitter output or an AM modulated carrier as shown on line E, FIG. 2. The modulated carrier transmitter output of line E, FIG. 2 is delivered via lead 42 from the carrier transmitter 25/41 to antenna 43.

Reference is now made to FIG. 3 which illustrates an electrical system in block diagram form. The electrical system of FIG. 3 depicts the remote receiver located at the equipment 82 to be controlled. The explanation that follows will make continuous reference to the wave forms set forth in FIG. 2 in order that the reader gain an appreciation of the real time operation of the receiver portion of the remote equipment control system that embodies the invention.

The modulated carrier transmitter output of line E, FIG. 2 appears at the antenna 61 and is carried along lead 62 to a receiver 64 of the carrier receiver 63. Attention is directed to a power source 59 shown separate and apart from the system of FIG. 3. The power source 59 has shown a power source terminal 60 which has a further designation in the form of the letter "Y". Each of the components depicted in this figure is schematically shown connected to the power source 59 by a power source terminal "Y". The power source 59 is always connected through a switch not shown to provide a power on condition at the remote receiver of FIG. 3 to maintain the receiver in an energized condition to allow receipt of the message signal when the remote equipment 82 is waiting to be controlled. The modulated carrier signal is demodulated by receiver 64 and the demodulated signal appears on lead 66 where it is next fed to analog to digital converter 67 which in turn provides a signal having the wave form shown on line P of FIG. 2.

The function of the AND, OR AND NOR gates shown in FIG. 3 are conventional in their operation and no further explanation of the operation will be offered. A study of the timing chart of FIG. 2 will make evident the conditions that will cause the respective gates to pass or block a signal's passage.

In order to gain an understanding of the real time operation of the receiver of FIG. 3, a study of the function of a timing unit or circuit 70 shown in dashed outline is required. The operation of the timing circuit 70 includes as a reference a clock 101 which operates at a frequency fc which frequency is the same as the clock 14 of FIG. 1. The clock frequency signal at fc appears on lead 102 and is simultaneously delivered to a frequency divider 103 via lead 102 as well as to a programable counter 105 designated #1, via leads 102, 104. The frequency divider 103 provides a data base rate which duplicates the data rate of frequency divider 29 of the transmitter in FIG. 1.

As has been noted when the wave form of line P, FIG. 2 appears on lead 68 its passage through AND #1 gate 69 requires that there be a plus condition present on lead 72 which lead 72 is connected to terminal b of AND #1 gate 69. Lead 68 is connected to terminal a of AND #1 gate 69. In order that the signal on lead 68 be allowed passage through AND #1 gate 69 to lead 71 and thence to serial-to-parallel converter 73 the terminal b of AND #1 gate 69 must be in a plus or positive state.

The appearance of this positive state of terminal b can be best understood if attention is directed to the quiesent state of NOR #1 gate 91 which has a terminal a connected by leads 88, 85 to a digital comparator 78 which is in turn electrically connected to the serial-to-parallel converter 73 via a plurality of electrical leads designated by reference numeral 76 and its associated arrow. In the quiesence state the digital comparator 78 provides no output and the leads 85, 88 and terminal a of NOR #1 gate 91 are at a zero or unenergized state as is shown on line G of FIG. 2. This zero state results in there being present a positive or plus state on lead 92 as is shown on line I of FIG. 2. This plus state on lead 92 is present at terminal a of OR gate 95 as shown on line M of FIG. 2. This plus state at terminal a of OR gate 95 results in there being present on lead 72 a plus or positive state as shown respectively on lines O and Q of FIG. 2. This positive state on lead 72 and terminal b of AND #1 gate 69 conditions AND #1 gate 69 to allow the passage of the heretofore noted transmitted signal that was present on lead 68, as shown on line P of FIG. 2. It is apparent, therefore, that when the signal having the wave form shown on line P, FIG. 2 appears, a like signal will be present on lead 71 from the AND #1 gate 69 and will take the form as is shown on line R of FIG. 2.

The serial-to-parallel converter 73 is provided a data base rate, at frequency $F_d$ via lead 74 which is connected to frequency divider 103 aforementioned. The digital comparator 78 is shown provided with a plurality of input leads titled "$N_a$ stored address lines". These leads are connected to a component not shown which has coded therein the unique address allocated to the given remote equipment to be operated by the remote transmitter of FIG. 1.

The serial-to-parallel converter 73 processes the incoming signal delivered on lead 71 and feeds the processed information to the digital comparator 78 via address lines 76. In the event the processed or decoded signal has an address that matches the unique address stored in the address lines, there will appear on lead 85 a momentary pulse 49, line G, FIG. 2. This momentary pulse 49 appearing at terminal a of NOR #1 gate 91 causes the plus state on lead 92 as shown on line I of FIG. 2 to go to a zero state. This zero state is likewise reflected in the condition of terminal a of OR gate 95, line M, FIG. 2., which in turn causes the plus state on lead 72 to go to a zero state. This zero state on lead 72 which is likewise present at terminal b of AND #1 gate 69 precludes the passage through the AND #1 gate 69 of the message signal on lead 68.

It is important to note that the appearance of pulse 49 on lead 85 is also simultaneously transmitted to programable counter #1 (105) via leads 85, 86 and 87. The appearance of this pulse 49 at the #1 programable counter 105 acts to enable or synchronize the start of #1 programable counter 105 in respect of the signal on lead 104 from clock 101 at frequency fc. The #1 programable counter 105 has shown a plurality of input lines 107 from a unit not shown which preset the level at which the counter will count and then produce an output on lead 106 as shown on line F of FIG. 2. This level or count $N_b$ as it is termed is the duty cycle $T_b$ and spans the time frame as is shown on line F of FIG. 2 which time span is the preselected interval between message signals unique to the system. When the duty cycle $T_b$ time occurs, a positive pulse 50 of time duration $T_m$ appears. This plus or positive pulse on lead 106 is transmitted via lead 106, 111 to terminal b of OR gate 95 which results in output of OR gate 95 going plus for example lead 72 and terminal b of AND #1 gate 69 also going plus, with thee attendant enabling of AND #1 gate 69 allowing the passage of the next arriving message signal of time duration $T_m$. This next arriving message signal of $T_m$ time duration appears on lead 71 as is shown on line R of FIG. 2 and enters the serial-to-parallel converter 73 for processing.

The pulse 49 from digital comparator also is employed to reset #2 programable counter 108 via leads 85, 86, 88. The output from #2 programable counter is shown on line V of FIG. 2. The #2 programable counter 108 with its $N_c$ input lines 109, which input lines are connected to unit not shown, provides the receiving portion of the system in FIG. 3 to establish the total number of times the system will look for the next arriving and subsequent message signal pulses without receiving an address correspondence pulse on line 88 from digital comparator 78. If no signal is received by #2 programable counter 108 for a number of message separation intervals $T_b$ as set by input lines 109, the output of #2 programable counter 108 will change from the denergized state to the plus or positive state. This will cause line 98 to become denergized and line 94 to become energized, energizing line 72 via the OR gate 95. These changes reinitialize the system to the point shown at the beginning of the timing diagrams in FIG. 2. This signal 52 shown on line U of FIG. 2 occurs only when terminals a and b of AND #2 gate are in a plus state which first occurs in any sequence of system operations when two consecutive message signals with correct address have been received. This occurs timewise when digital comparator 78 has recognized the next arriving correct message address and momentary pulse 51, lines G and S, FIG. 2 appears at #2 AND gate 100 terminal a via leads 85, 89. More will be said in respect of signal 52 of line U, FIG. 2 hereinafter.

Returning now to a discussion the next arriving message signal that has been enabled via the timing circuit 70's #1 AND gate 69. The serial-to-parallel converter 73 processes or decodes the message signals delivering the address portion to digital comparator 78 as described earlier and code command control portion of the message signal to date control gate 79 via leads 77. The data control gate 79 is enabled the instant momentary pulse 52 as shown on line U, FIG. 2, appears on lead 90. The enabling of date control gate 79 allows the decoded command to be delivered to data output lines 81 to the equipment to be controlled 82 where the desired actuation commanded at the remote transmitter is accomplished.

From the above description it can be seen that with the system described the transmitter can be pulsed on and off at will and need only be on when a command is desired to be performed at the remote equipment. This inherent feature of the invention results in substantial power savings in comparison to continuous power transmission systems of the past.

While the description that is set forth above speaks to the theory and practice of the invention, it should also be recognized that the employment of the invention allows for the transmission of a large amount of date within a short period of time. Typically, the message signal duration is only 40 to 60 milliseconds. This message signal time duraton gains significance when it is recognized that human response time is in the range of one tenth (0.1) of a second and the associated machinery to be actuated has a response time of between one half ($\frac{1}{2}$) and one (1) second. Accordingly, during a given message signal time duration between 16 and 48 bits of information can readily be transmitted.

The low duty cycle inherent in the invention's communication link coupled with the unique coding arrangement allows for system operation that approaches in safety the random function systems of the past while greatly simplifying the equipment and enhancing system reliability.

While the present invention has been illustrated and disclosed in connection with the details of the illustrative embodiment thereof, it should be understood that this illustrative embodiment is only limited by the invention as set forth in accompanying claims.

What is claimed as new is as follows:

1. A remote equipment control system having a low duty cycle communication link between a remote command transmitter and a remote receiver, said remote receiver controlling coupled to said equipment, said remote command transmitter including means to transmit a message signal of a set time duration at a preselected message separation interval, said remote receiver including a decoding means and a timing means, said decoding means responsive to a portion of a first received message to provide an enabling signal to be delivered to said timing means, said timing means upon receipt of said enabling signal provides an output to said decoding means to prevent entry of any message signal to said decoder for a time duration matching said preselected message separation interval and allowing entry of a message signal for a time duration matching said set time duration of said message signal, said decoding means including means responsive to said enabling signal such that said decoding means is in a condition to accept the next arriving message signal allowed entry when said next arriving message signal has a message portion that matches said portion of said first received message signal whereupon said decoding means decodes the remaining portion of said next arriving message signal and allows a command signal to be delivered to said equipment to be controlled.

2. The remote control system of claim 1 wherein said remote command transmitter is always in a power off condition except when said remote control of equipment is operated.

3. The remote control system of claim 2, wherein said remote receiver is always energized to an on condition to receive said message signal when said remote control equipment is to be controlled.

4. The remote control system of claim 3 wherein said message separation interval is always greater in time duration than said message signal of set time duration.

5. A remote control system for use in the remote control of equipment, said remote control system including (a) a remote command transmitter, including means to transmit a message signal of a set time duration at a preselected message separation interval, said message signal having a unique address portion and a command portion, and (b) a receiver which includes a decoding means and a timing means, said decoding means responsive to said unique address portion of a received message to provide an enabling signal to be delivered to said timing means, said timing means upon receipt of said enabling signal provides an output to said decoding means to prevent entry of any message signals to said decoder for a time duration matching said preselected message separation interval and allowing entry of a message signal for a time duration matching said set time duration of said message signal, said decoding means includes means responsive to said enabling signal such that said decoding means is in a condition to accept the next arriving message signal allowed entry which has said unique address, whereupon said message signal command portion is decoded and a command signal is delivered to said remote equipment to be controlled.

6. The remote control system of claim 5 wherein said remote command transmitter is always in a power off condition except when said remote control of equipment is operated.

7. The remote control system of claim 6, wherein said remote receiver is always energized to an on condition to receive said message signal when said remote control equipment is to be controlled.

8. The remote control system of claim 7 wherein said message separation interval is always greater in time duration than the said message signal of set time duration.

* * * * *